United States Patent
Gui et al.

(10) Patent No.: US 9,943,827 B2
(45) Date of Patent: Apr. 17, 2018

(54) DECHLORINATING AGENT FOR BLAST FURNACE TOP GAS

(71) Applicant: Hebei United University, Tangshan, Hebei (CN)

(72) Inventors: Yongliang Gui, Hebei (CN); Chunyan Song, Hebei (CN); Binsheng Hu, Hebei (CN); Kai Lv, Hebei (CN); Aijun Teng, Hebei (CN); Bo Zhang, Hebei (CN)

(73) Assignee: Hebei United University, Tangshan, Hebei (CN)

( * ) Notice: Subject to any disclaimer, the term of this patent is extended or adjusted under 35 U.S.C. 154(b) by 394 days.

(21) Appl. No.: 14/749,613

(22) Filed: Jun. 24, 2015

(65) Prior Publication Data
US 2016/0271586 A1 Sep. 22, 2016

(30) Foreign Application Priority Data
Mar. 18, 2015 (CN) .......................... 2015 1 0118791

(51) Int. Cl.
*B01J 20/12* (2006.01)
*B01J 20/30* (2006.01)
*B01J 20/04* (2006.01)

(52) U.S. Cl.
CPC ......... *B01J 20/3021* (2013.01); *B01J 20/041* (2013.01); *B01J 20/043* (2013.01); *B01J 20/12* (2013.01); *B01J 20/3078* (2013.01); *B01D 2257/2045* (2013.01); *B01J 2220/42* (2013.01)

(58) Field of Classification Search
CPC ........ B01J 20/3021; B01J 20/12; B01J 20/00; B01J 20/3078; B01J 20/043; B01J 20/041; B01J 20/30; B01J 2220/42; B01D 2257/2045
See application file for complete search history.

(56) References Cited

PUBLICATIONS

CN103386244, tiancun et al, 2013, see machine translation.*

* cited by examiner

*Primary Examiner* — Melvin C. Mayes
*Assistant Examiner* — Smita S Patel

(57) ABSTRACT

A dechlorinating agent for blast furnace top gas prepared by the steps of: selecting industrial limestone, commercial sodium carbonate and potassium hydroxide; soaking the raw industrial limestone in a potassium hydroxide solution, wherein a concentration of the potassium hydroxide solution is 10%-15%; heating the soaked limestone at 700° C. for calcination; grinding the light-burned limestone obtained by calcining the limestone and sodium carbonate until the particle size is below 20 μm; mixing the light-burned limestone and the sodium carbonate at a proportion of 30-70:70-30 for 10-15 min; grinding the resultant mixture by milling process until the particle sizes of all powders are less than 80 μm; adding 3% bentonite in the prepared mixing powder and fully mix the mixture; pelletizing the mixture with atomized water using a disc pelletizer; and selecting pellets of 3-10 mm in size; drying the said pellet at a temperature below 100° C.

4 Claims, No Drawings

DECHLORINATING AGENT FOR BLAST FURNACE TOP GAS

FIELD OF INVENTION

The present invention relates to the field of complex-component high-temperature gas purification, specifically to a dechlorinating agent for blast furnace top gas.

BACKGROUND

The BF gas in dry dedusting technology of blast furnace gas is dedusted primarily by a gravity dust removal system, and then enters a bag precipitator for secondary dedusting; afterwards, the purified gas enters the TRT for decompression and used to drive the generator to generate power. Compared with the wet dedusting method of scrubber, venturi tube and double venturi tube, blast furnace gas dry dedusting technology has a great advantage, namely, high purification efficiency, significant reduction of water consumption, more importantly, greatly improving electric energy generated by TRT, increasing energy recovery and utilization and decreasing energy consumption for each ton of iron.

With the development of iron and steel industry in China, especially the increase in production cost, cheap iron ores have attracted attention and have gradually been utilized. The high content of trace elements, especially harmful elements in cheap iron ores, particularly the increase of chlorine contents entering the blast furnace, leads to the rising of HCl content in blast furnace gas, aggravating the corrosion of pipes and equipment. In recent years, metal members such as blast furnace gas pipes and TRT blades in various iron & steel enterprises are eroded by HCl to different extents. As a result, one of the most critical issues in metallurgical field is to study the removal of HCl in blast furnace gas under dry dedusting conditions.

A number of studies on HCl removal have been made in the fields of integrated gasification combined cycle (IGCC), molten carbonate fuel cell (MCFC), petrochemical and waste incineration; for example, with the fixed bed technology, the dechlorinating agent used is mostly alkaline dechlorinating agent, including lime-based (limestone, slaked lime and quick lime) and sodium-based (soda powder and baking soda) dechlorinating agent. However, due to the unique properties of blast furnace gas such as rapid flow rate, large flow amount, high pressure, high content of $CO_2$, water vapor and dust, these processes and technologies are not suitable to BG gas.

Based on the study above and in view of the characteristics of blast furnace top gas, this invention discloses a dechlorinating agent featuring low cost, good dechlorination effect that is capable of being fully applied in blast furnace top gas.

BRIEF SUMMARY OF THE INVENTION

The objective of the present invention is to provide a dechlorinating agent for blast furnace top gas featuring low cost and good dechlorination effect.

To achieve the objective above, the present invention employs the following technical solution:

I). Select industrial limestone, commercial sodium carbonate and potassium hydroxide as raw materials for making the dechlorinating agent, wherein the particle size of the limestone is less than 5 mm, and wherein the particles size of the sodium carbonate and potassium hydroxide is less than 3 mm;

II). Soak the raw industrial limestone in a potassium hydroxide solution for 1 hour, wherein the concentration of the potassium hydroxide solution is 10%-15%, and then heat the soaked limestone at 700° C. high-temperature condition for calcination for 1-2 hours;

III). Grind the light-burned limestone obtained by calcining limestone and sodium carbonate until the particle size is below 20 μm with common ball mill process or other milling process, prepare materials by the proportion of light-burned limestone:sodium carbonate=30-70:70-30 (weight percentage), pre-mix them for 10-15 min, and then grind the resultant mixture by milling process until the particle sizes of all powders are less than 80 μm;

IV). Add 3% bentonite in the prepared mixing powder and mix fully. Add atomized water for pelletizing with a disc pelletizer, screen out finished small balls of 3-10 mm, and dry in the air completely or under 100° C. low-temperature drying condition to get the finished product of the dechlorinating agent.

By measuring the breakthrough time and primary breakthrough chlorine content of the product above, the optimized product has long breakthrough time and high primary breakthrough chlorine content, showing excellent performance.

The merits of the present invention are the utilization of low-cost raw materials and provision of suitable proportion and simple preparation method to finally get a high-performance dechlorinating agent for blast furnace top gas.

DETAILED DESCRIPTION OF THE INVENTION

The present invention will be detailed hereinafter through specific experimental examples.

Experimental Example 1

I). Select industrial limestone, commercial sodium carbonate and potassium hydroxide as raw materials for making the dechlorinating agent, wherein the particle size of the limestone is less than 5 mm, and the particle size of the sodium carbonate and potassium hydroxide is less than 3 mm;

II). Soak the raw industrial limestone in a potassium hydroxide solution for 1 h, wherein the concentration of the potassium hydroxide solution is 10%, and then place the soaked limestone to a 700° C. high-temperature condition for calcination for 1 h;

III). Grind the light-burned limestone obtained by calcining limestone and sodium carbonate until the particle size is below 20 μm with common ball mill process or other milling process, prepare materials by the proportion of light-burned limestone:sodium carbonate=30:70 (weight percentage), pre-mix them for 10 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Experimental Example 2

I). Select industrial limestone, commercial sodium carbonate and potassium hydroxide as raw materials for making the dechlorinating agent, wherein the particle size of the limestone is less than 5 mm, and that of the sodium carbonate and potassium hydroxide is less than 3 mm;

II). Soak the raw industrial limestone in a potassium hydroxide solution for 1 h, wherein the concentration of the potassium hydroxide solution is 15%, and then place the soaked limestone to a 700° C. high-temperature condition for calcination for 1 h;

III). Grind the light-burned limestone obtained by calcining limestone and sodium carbonate until the particle size is below 20 μm with common ball mill process or other milling process, prepare materials by the proportion of light-burned limestone:sodium carbonate=30:70 (weight percentage), pre-mix them for 10 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Experimental Example 3

I). Select industrial limestone, commercial sodium carbonate and potassium hydroxide as raw materials for making the dechlorinating agent, wherein the particle size of the limestone is less than 5 mm, and that of the sodium carbonate and potassium hydroxide is less than 3 mm;

II). Soak the raw industrial limestone in a potassium hydroxide solution for 1 h, wherein the concentration of the potassium hydroxide solution is 15%, and then place the soaked limestone to a 700° C. high-temperature condition for calcination for 2 h;

III). Grind the light-burned limestone obtained by calcining limestone and sodium carbonate until the particle size is below 20 μm with common ball mill process or other milling process, prepare materials by the proportion of light-burned limestone:sodium carbonate=30:70 (weight percentage), pre-mix them for 10 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Experimental Example 4

I). Select industrial limestone, commercial sodium carbonate and potassium hydroxide as raw materials for making the dechlorinating agent, wherein the particle size of the limestone is less than 5 mm, and that of the sodium carbonate and potassium hydroxide is less than 3 mm;

II). Soak the raw industrial limestone in a potassium hydroxide solution for 1 h, wherein the concentration of the potassium hydroxide solution is 15%, and then place the soaked limestone to a 700° C. high-temperature condition for calcination for 2 h;

III). Grind the light-burned limestone obtained by calcining limestone and sodium carbonate until the particle size is below 20 μm with common ball mill process or other milling process, prepare materials by the proportion of light-burned limestone:sodium carbonate=50:50 (weight percentage), pre-mix them for 15 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Experimental Example 5

I). Select industrial limestone, commercial sodium carbonate and potassium hydroxide as raw materials for making the dechlorinating agent, wherein the particle size of the limestone is less than 5 mm, and that of the sodium carbonate and potassium hydroxide is less than 3 mm;

II). Soak the raw industrial limestone in a potassium hydroxide solution for 1 h, wherein the concentration of the potassium hydroxide solution is 15%, and then place the soaked limestone to a 700° C. high-temperature condition for calcination for 2 h;

III). Grind the light-burned limestone obtained by calcining limestone and sodium carbonate until the particle size is below 20 μm with common ball mill process or other milling process, prepare materials by the proportion of light-burned limestone:sodium carbonate=60:40 (weight percentage), pre-mix them for 10 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Experimental Example 6

I). Select industrial limestone, commercial sodium carbonate and potassium hydroxide as raw materials for making the dechlorinating agent, wherein the particle size of the limestone is less than 5 mm, and that of the sodium carbonate and potassium hydroxide is less than 3 mm;

II). Soak the raw industrial limestone in a potassium hydroxide solution for 1 h, wherein the concentration of the potassium hydroxide solution is 15%, and then place the soaked limestone to a 700° C. high-temperature condition for calcination for 1.5 h;

III). Grind the light-burned limestone obtained by calcining limestone and sodium carbonate until the particle size is below 20 μm with common ball mill process or other milling process, prepare materials by the proportion of light-burned limestone:sodium carbonate=70:30 (weight percentage), pre-mix them for 13 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Experimental Example 7

I). Select industrial limestone, commercial sodium carbonate and potassium hydroxide as raw materials for making the dechlorinating agent, wherein the particle size of the limestone is less than 5 mm, and that of the sodium carbonate and potassium hydroxide is less than 3 mm;

II). Soak the raw industrial limestone in a potassium hydroxide solution for 1 h, wherein the concentration of the potassium hydroxide solution is 15%, and then place the soaked limestone to a 700° C. high-temperature condition for calcination for 1.5 h;

III). Grind the light-burned limestone obtained by calcining limestone and sodium carbonate until the particle size is below 20 μm with common ball mill process or other milling process, prepare materials by the proportion of light-burned limestone:sodium carbonate=40:60 (weight percentage), pre-mix them for 15 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Experimental Example 8

I). Select industrial limestone, commercial sodium carbonate and potassium hydroxide as raw materials for making the dechlorinating agent, wherein the particle size of the limestone is less than 5 mm, and that of the sodium carbonate and potassium hydroxide is less than 3 mm;

II). Soak the raw industrial limestone in a potassium hydroxide solution for 1 h, wherein the concentration of the potassium hydroxide solution is 10%, and then place the soaked limestone to a 700° C. high-temperature condition for calcination for 2 h;

III). Grind the light-burned limestone obtained by calcining limestone and sodium carbonate until the particle size is below 20 μm with common ball mill process or other milling process, prepare materials by the proportion of light-burned limestone:sodium carbonate=50:50 (weight percentage), pre-mix them for 12 min, and then grind the resultant mixture by milling process until the particle sizes of all powders are less than 80 μm;

IV). Add 3% bentonite in the prepared mixing powder and mix fully, add atomized water for pelletizing with a disc pelletizer, screen out finished small balls of 3-10 mm, and dry in a 100° C. low-temperature condition to get the product of the dechlorinating agent.

Place the finished small balls dried in a dry environment for future use.

The selected performance evaluation indexes of the dechlorinating agent are breakthrough time and primary breakthrough chlorine content.

The dechlorination experiment process comprises placing certain amount of the dechlorinating agent product in a HCl removal device, and making the material layer thickness and the HCl concentration in the blast furnace top gas constant, inflating the device with experimental gas, and maintaining the flow rate of the gas relatively stable so that the dechlorinating agent product fully reacts with the gas in the device.

Breakthrough time: in the dechlorinating test device, when the HCl content in the tail gas, which is the simulated blast furnace top gas purified by dechlorinating agent, exceeds 1 ppm, it is considered the dechlorinating agent is broken through. The time from the introduction of HCl to the breakthrough of the dechlorinating agent is the breakthrough time.

The method for measuring breakthrough time can comprise the flow rate of the simulated blast furnace gas is controlled to 5 L/min, the HCl concentration in simulated blast furnace gas is controlled to 200 ppm, measuring the HCl concentration at the outlet of the fixed bed reactor, recording the time when the HCl concentration reaches 1 ppm, and calculating the breakthrough time.

Primary breakthrough chlorine content: breakthrough chlorine content means the mass percentage of chlorine adsorbed by the dechlorinating agent when the HCl concentration at the outlet of the reactor equals the HCl concentration at the inlet and maintains for 10 min within the temperature range of 0-300° C. and under the pressure condition of 0.1-0.3 MPa. The volume fraction of the HCl at the inlet is 0.99%.

The method for measuring primary breakthrough chlorine content can comprise making sure that the inlet amount of simulated blast furnace top gas is 5 L/min, HCl concentration is 1000 ppm and the test time is 30 min, taking 20 dechlorinating agent pellets randomly and measuring the primary breakthrough chlorine content with a gas laser analyzer.

Different dechlorinating agents have diversified breakthrough time. The longer the breakthrough time, the better the actual reaction of the dechlorinating agent with the HCl in blast furnace gas and the easier the removal of the HCl in blast furnace gas with the same material layer thickness. Different dechlorinating agents have diversified primary breakthrough chlorine content. The higher the primary breakthrough chlorine content of the dechlorinating agent, the stronger the capacity that the dechlorinating agent removes the HCl in the blast furnace top gas.

Table 1 lists the measuring results of breakthrough time and primary breakthrough chlorine content in 8 experimental examples.

TABLE 1

Measuring results of breakthrough time and primary breakthrough chlorine content

| Example No. | Breakthrough time, min | Primary breakthrough chlorine content, % |
| --- | --- | --- |
| 1 | 409 | 5.87 |
| 2 | 412 | 5.89 |
| 3 | 415 | 5.91 |
| 4 | 404 | 5.86 |
| 5 | 397 | 5.86 |
| 6 | 393 | 5.85 |
| 7 | 411 | 5.90 |
| 8 | 403 | 5.85 |

According to the results listed in Table 1, the proportion of light-burned limestone and sodium carbonate in the dechlorinating agent has obvious influences on breakthrough time and primary breakthrough chlorine content, and the high-temperature calcination time of light-burned limestone also influences the dechlorination effect.

Comparing with light-burned limestone, $Na_2CO_3$ has higher primary breakthrough chlorine content because certain amount of $H_2O$ may be generated when $Na_2CO_3$ reacts with HCl. Therefore, the proportion of the two substances (light-burned limestone and $Na_2CO_3$) in the dechlorinating agent affects the dechlorination effect.

Limestone also has favorable dechlorination effect. However, it is found that, when limestone is partly decomposed after undergoing light burning, its porosity is greatly increased, thus improving the dynamic condition of reaction with HCl and the dechlorination effect. Therefore, light-burned limestone is adopted in the present invention. A certain number of micropores with diameter of 20-100 μm exist on the surface of limestone, and the order of magnitude of micropores in one square millimeter is $0-10\times10^3$; light-burned limestone has more micropores whose diameter is 0.1-20 μm, and the order of magnitude of micropores in one square millimeter is $0-10\times10^5$. Gas molecule is selective in adsorption (polar adsorption for short). The micropores on the surface of the dechlorinating agent are prone to adsorb molecules with the diameter similar to the diameter of the micropores in the gas molecules. The molecule of HCl has a diameter around 10 μm, close to the diameter range of the micropores on the surface of light-burned limestone. According to the principle of polar adsorption, light-burned limestone is easier to adsorb HCl molecules in blast furnace gas than limestone, thus increasing the breakthrough chlorine content of the limestone dechlorinating agent. High-temperature calcination time is bound to affect calcination effect, and further affect the dechlorination capacity of limestone.

KOH also has certain dechlorination effect, but it easily adsorbs surrounding water and deliquesce due to strong basicity and corrosivity, and further forms aqueous alkali with strong basicity, seriously eroding blast furnace gas pipes and other auxiliary facilities. Therefore, KOH is not designed to be a component in the present invention, instead, limestone is soaked and then lightly burned to take in a proper amount of KOH to improve dechlorination effect.

Based on the experiments and result analysis above, it is found that, just because of the selection of suitable materials, proper proportion and optimized preparation process, the high-performance dechlorinating agent for blast furnace top gas obtained better applies to the field of metallurgical engineering and effectively prolongs the service life of the device and reduces production cost.

What is claimed is:

1. A method for preparing a dechlorinating agent for blast furnace top gas comprising:
   selecting limestone, sodium carbonate and potassium hydroxide, wherein the limestone is less than 5 mm in size, and wherein the sodium carbonate and potassium hydroxide are less than 3 mm in size;
   soaking the limestone in a potassium hydroxide solution for one (1) hour, wherein a concentration of the potassium hydroxide solution is 10%-15%;
   heating the soaked limestone at 700° C. for calcination for 1-2 hours;
   grinding the limestone obtained by calcining the limestone and sodium carbonate until the limestone is below 20 μm in size by common ball mill process;
   mixing the limestone and the sodium carbonate at a proportion of 30-70:70-30 by weight percentage for 10-15 min;
   grinding the limestone and the sodium carbonate by milling process until all powders are less than 80 μm in size;
   adding 3 wt % bentonite to the limestone and the sodium carbonate and fully mixing the bentonite, the limestone and the sodium carbonate;
   pelletizing the bentonite, the limestone and the sodium carbonate with atomized water using a disc pelletizer, and select pellets of 3-10 mm in size;
   drying the selected pellets at a temperature below 100° C.

2. A method for preparing a dechlorinating agent for blast furnace top gas as described in claim 1, wherein a proportion of the limestone to sodium carbonate is 40:60 by weight percentage.

3. A dechlorinating agent for blast furnace top gas prepared by the steps of:
   selecting limestone, sodium carbonate and potassium hydroxide, wherein the limestone is less than 5 mm in size, and wherein the sodium carbonate and potassium hydroxide are less than 3 mm in size;
   soaking the limestone in a potassium hydroxide solution for one (1) hour, wherein a concentration of the potassium hydroxide solution is 10%-15%;
   heating the soaked limestone at 700° C. for calcination for 1-2 hours;
   grinding the limestone obtained by calcining the limestone and sodium carbonate until the limestone and sodium carbonate are below 20 μm in size by common ball mill process;
   mixing the limestone and the sodium carbonate at a proportion of 30-70:70-30 for 10-15 min;
   grinding the limestone and the sodium carbonate by milling process until all powders are less than 80 μm in size;
   adding 3 wt % bentonite in the limestone and the sodium carbonate and fully mixing the bentonite, the limestone and the sodium carbonate;
   pelletizing the bentonite, the limestone and the sodium carbonate with atomized water using a disc pelletizer, and select pellets of 3-10 mm in size;
   drying the selected pellets at a temperature below 100° C.

4. A dechlorinating agent for blast furnace top gas as described in claim 3, wherein a proportion of the limestone to sodium carbonate is 40:60 by weight percentage.

* * * * *